(12) United States Patent
Elliott

(10) Patent No.: US 7,460,670 B1
(45) Date of Patent: Dec. 2, 2008

(54) SYSTEMS AND METHODS FOR MANAGING QUANTUM CRYPTOGRAPHIC NETWORKS

(75) Inventor: Brig Barnum Elliott, Arlington, MA (US)

(73) Assignee: BBN Technologies Corp., Cambridge, MA (US)

(*) Notice: Subject to any disclaimer, the term of this patent is extended or adjusted under 35 U.S.C. 154(b) by 727 days.

(21) Appl. No.: 10/324,355

(22) Filed: Dec. 20, 2002

(51) Int. Cl.
*H04K 1/00* (2006.01)

(52) U.S. Cl. .................. 380/256; 380/255; 380/277; 709/224; 726/2; 726/3

(58) Field of Classification Search .......... 709/224; 380/256
See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 4,770,535 A | 9/1988 | Kim et al. | |
| 5,058,973 A | 10/1991 | Refregier et al. | |
| 5,243,649 A | 9/1993 | Franson | 380/9 |
| 5,307,410 A | 4/1994 | Bennett | |
| 5,311,572 A | 5/1994 | Friedes et al. | |
| 5,325,397 A * | 6/1994 | Scholz et al. | 375/224 |
| 5,339,182 A | 8/1994 | Kimble et al. | 359/112 |
| 5,400,325 A | 3/1995 | Chatwani et al. | |
| 5,414,771 A | 5/1995 | Fawcett, Jr. | 380/44 |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | 380/21 |
| 5,710,773 A | 1/1998 | Shiga | |
| 5,729,608 A | 3/1998 | Janson et al. | |
| 5,732,139 A | 3/1998 | Lo et al. | 380/28 |
| 5,757,912 A * | 5/1998 | Blow | 380/256 |
| 5,764,765 A | 6/1998 | Phoenix et al. | 380/21 |
| 5,764,767 A | 6/1998 | Beimel et al. | |
| 5,768,378 A | 6/1998 | Townsend et al. | 380/21 |
| 5,805,801 A | 9/1998 | Holloway et al. | |
| 5,850,441 A | 12/1998 | Townsend et al. | 380/21 |
| 5,911,018 A | 6/1999 | Bischel et al. | |
| 5,953,421 A | 9/1999 | Townsend | 380/21 |
| 5,960,131 A | 9/1999 | Fouquet et al. | |

(Continued)

FOREIGN PATENT DOCUMENTS

WO    WO 02/05480    1/2002

OTHER PUBLICATIONS

"Quantum key distribution: Real-time compensation of interferometer phase drift," NTNU Department of Physical Electronics, pp. 1-45.

(Continued)

*Primary Examiner*—Nasser Moazzami
*Assistant Examiner*—Roderick Tolentino
(74) *Attorney, Agent, or Firm*—Ropes & Gray LLP

(57) ABSTRACT

A system (125) performs network management in a quantum cryptographic network (115). The system (125) monitors parameters associated with multiple links and multiple nodes of the quantum cryptographic network (115). The system (125) manages the multiple links and multiple nodes of the quantum cryptographic network (115) based on the monitored parameters.

4 Claims, 14 Drawing Sheets

U.S. PATENT DOCUMENTS

| | | | |
|---|---|---|---|
| 5,960,133 A | 9/1999 | Tomlinson | |
| 5,966,224 A | 10/1999 | Hughes et al. | 359/112 |
| 6,005,993 A | 12/1999 | MacDonald | |
| 6,028,935 A | 2/2000 | Rarity et al. | |
| 6,052,465 A | 4/2000 | Gotoh et al. | |
| 6,097,696 A | 8/2000 | Doverspike | |
| 6,122,252 A | 9/2000 | Aimoto et al. | |
| 6,130,780 A | 10/2000 | Joannopoulos et al. | |
| 6,145,024 A | 11/2000 | Maezawa et al. | |
| 6,154,586 A | 11/2000 | MacDonald et al. | |
| 6,160,651 A | 12/2000 | Chang et al. | |
| 6,188,768 B1 | 2/2001 | Bethune et al. | |
| 6,233,075 B1 | 5/2001 | Chang et al. | |
| 6,233,393 B1 | 5/2001 | Yanagihara et al. | |
| 6,289,104 B1 | 9/2001 | Patterson et al. | |
| 6,341,127 B1 | 1/2002 | Katsube et al. | |
| 6,378,072 B1 | 4/2002 | Collins et al. | |
| 6,430,345 B1 | 8/2002 | Dultz et al. | |
| 6,463,060 B1 | 10/2002 | Sato et al. | |
| 6,507,012 B1 | 1/2003 | Medard et al. | |
| 6,519,062 B1 | 2/2003 | Yoo | |
| 6,522,749 B2 | 2/2003 | Wang | |
| 6,529,498 B1 | 3/2003 | Cheng | |
| 6,532,543 B1 * | 3/2003 | Smith et al. | 726/14 |
| 6,539,410 B1 | 3/2003 | Klass | |
| 6,560,707 B2 | 5/2003 | Curtis et al. | |
| 6,563,796 B1 | 5/2003 | Saito | |
| 6,594,055 B2 | 7/2003 | Snawerdt | |
| 6,605,822 B1 | 8/2003 | Blais et al. | |
| 6,646,727 B2 | 11/2003 | Saleh et al. | |
| 6,647,010 B1 | 11/2003 | Ford et al. | |
| 6,650,805 B2 | 11/2003 | Chen et al. | |
| 6,654,346 B1 | 11/2003 | Mahalingaiah et al. | |
| 6,661,806 B1 | 12/2003 | Eriksson et al. | |
| 6,678,379 B1 | 1/2004 | Mayers et al. | |
| 6,684,335 B1 | 1/2004 | Epstein et al. | |
| 6,728,281 B1 | 4/2004 | Santori et al. | |
| 6,748,434 B2 * | 6/2004 | Kavanagh | 709/224 |
| 6,754,214 B1 | 6/2004 | Mahalingaiah | |
| 6,778,557 B1 | 8/2004 | Yuki et al. | |
| 6,799,270 B1 | 9/2004 | Bull et al. | |
| 6,801,626 B1 | 10/2004 | Nambu | |
| 6,836,463 B2 | 12/2004 | Garcia-Luna Aceves et al. | |
| 6,862,564 B1 * | 3/2005 | Shue et al. | 703/25 |
| 6,882,431 B2 | 4/2005 | Teich et al. | |
| 6,895,091 B1 | 5/2005 | Elliott et al. | |
| 6,895,092 B2 | 5/2005 | Tomita | |
| 6,897,434 B1 | 5/2005 | Kumar et al. | |
| 6,986,056 B1 | 1/2006 | Dultz et al. | |
| 7,028,059 B2 | 4/2006 | Williams et al. | |
| 7,035,411 B2 | 4/2006 | Azuma et al. | |
| 2001/0038695 A1 | 11/2001 | Kim | |
| 2002/0015573 A1 | 2/2002 | Ishibashi | |
| 2002/0021467 A1 | 2/2002 | Ofek et al. | |
| 2002/0025041 A1 | 2/2002 | Tomita | |
| 2002/0097874 A1 | 7/2002 | Foden et al. | |
| 2002/0110245 A1 | 8/2002 | Gruia | |
| 2002/0141019 A1 | 10/2002 | Chang et al. | |
| 2003/0002074 A1 | 1/2003 | Nambu et al. | |
| 2003/0002670 A1 | 1/2003 | Wang | |
| 2003/0002674 A1 * | 1/2003 | Nambu et al. | 380/256 |
| 2003/0059157 A1 | 3/2003 | DeCusalis et al. | |
| 2003/0137944 A1 | 7/2003 | Medvinsky | |
| 2003/0215088 A1 | 11/2003 | Bao | |
| 2003/0231771 A1 | 12/2003 | Gisin et al. | |
| 2004/0005056 A1 | 1/2004 | Nishioka et al. | |
| 2004/0008843 A1 | 1/2004 | Van Enk | |
| 2004/0019676 A1 * | 1/2004 | Iwatsuki et al. | 709/224 |
| 2004/0165884 A1 | 8/2004 | Al-Chalabi | |
| 2004/0190725 A1 | 9/2004 | Yuan et al. | |
| 2005/0036624 A1 | 2/2005 | Kent et al. | |
| 2006/0252381 A1 | 11/2006 | Sasaoka et al. | |

OTHER PUBLICATIONS

"Quantum Public Key Distribution System," IBM Technical Disclosure Bulletin, 28(7):3153-3163 (Dec. 7, 1985).

Awduche, D.O., et al., "Multi-Protocol Lambda Switching: Combining MPLS Traffic Engineering Control With Optical Crossconnects," Internet Draft (Jan. 2001).

Basak, D., et al., "Multi-protocol Lambda Switching: Issues in Combining MPLS Traffic Engineering Control With Optical Cross-connects," Internet draft (Aug. 2000).

Bennett, C.H., et al., "Experimental Quantum Cryptography," Journal of Cryptography's special issue after Eurocrypt '90, 28 pages (Sep. 1991).

Bennett, C.H., et al., "Generalized Privacy Amplification," IBM Research, 24 pages (May 31, 1995).

Bethune, D.S., et al., "An Autocompensating Fiber-Optic Quantum Cryptography System Based on Polarization Splitting of Light," IEEE Journal of Quantum Electronics, XX(Y):100-108 (1999).

Bethune, D.S., et al., "Prototype Autocompensating Quantum Cryptography System Based on Polarization Splitting of Light," Session QC41—Quantum Computing and Cryptograph, Oral session, Wednesday morning, Mar. 24, 1999, Liberty Room, Omni Hotel.

Brassard, G., et al., "Cryptology Column—25 Years of Quantum Cryptography," Pragocrypt, pp. 13-24 (Jul. 1996).

Brassard, G., et al., "Secret-Key Reconciliation by Public Discussion," Department IRO, Universite de Montreal, 14 pages (1994).

Cabello, A., "Multiparty key distribution and secret sharing based on entanglement swapping," pp. 1-8, (Sep. 7, 2000).

Crepeau, C., et al., "Secure Multi-party Quantum Computation," ACM, pp. 1-10 (2001).

Eisenberg, S., "Lucent Technologies names Cherry Murray physical sciences research vice president," Press Release (Mar. 28, 2000).

Ekert, A.K., "Quantum Cryptography Based on Bell's Theorem," Physical Review Letters, 67(6):661-663 (1991).

Elliott, B.B., et al., "Path-length control in a interferometric QKD link," Proc. of SPIE, vol. #5101, 11 pages (Apr. 21, 2003).

Elliott, C., "Building the quantum network," New J. Phys., 4:46 (2002).

Franson, J.D., "Bell Inequality for Position and Time," Physical Review Letters, 62(19):2205-2208 (1989).

Gisin, N., et al., "Quantum cryptography and long distance Bell experiments: How to control decoherence," Geneva, Switzerland, pp. 1-7 and 4 pages of drawings (Jan. 15, 1999).

Gisin, N., et al., "Quantum cryptography," Reviews of Modern Physics, 74:145-184 (2002).

Gottesman, D., et al., "Secure quantum key distribution using squeezed states," pp. 1-19 (Sep. 25, 2000).

Jennewein, T., et al., "Quantum Cryptography with Entangled Photons," Physical Review Letters, 84(20):4729-4732 (2000).

Lin, L.Y., et al., "Free-Space Micromachined Optical Switches for Optical Networking," IEEE Journal of Selected Topics in Quantum Electronics, 5(1):4-9 (1999).

Maurer, U., et al., "Information-Theoretic Key Agreement: From Weak to Strong Secrecy for Free," Computer Science Department, Swiss Federal Institute of Technology, 20 pages (2000).

Maurer, U.M., "Secret Key Agreement by Public Discussion From Common Information," IEEE Transactions on Information Theory, 39:733-742 (1993).

Mo, X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhui.

Naik, D.S., et al., "Entangled State Quantum Cryptography: Eavesdropping on the Ekert Protocol," Physical Review Letters, 84(20):4733-4736 (2000).

Ribordy, G., et al., "Long-distance entanglement-based quantum key distribution," Physical Review A, vol. 63, 012309-1-012309-12 (2001).

Rosen, E., et al., "Multiprotocol Label Switching Architecture," MPLS Architecture, 1-61 (Jan. 2001).

Scarani, V., et al., "Quantum Cryptography Protocols Robust Against Photon Number Splitting Attacks for Weak Lazer Pulse Implementations,"Physical Review Letters, 92(5):057901-1 through 057901-4 (Feb. 2004).

Scarani, V., et al., "Quantum cryptography protocols robust against photon number splitting attacks," ERATO Conference on Quantum Information Science 2003, Sep. 4-6, 2003, Niijimakaikan, Kyoto Japan; 2 pages.

Schneier, B., "Applied Cryptography," Second Edition, Chapter 10, Oct. 18, 1995 Wiley & Sons Publ., pp. 216-220.

Stucki D., et al., "Quantum Key Distribution over 67 km with a plug&play system," New Journal of Physics, 41.1-41.8 (2002).

Tanzilli, S., et al., "PPLN waveguide for quantum communication," Eur. Phys. J.D., 18:155-160 (2002).

Tittel, W., et al., "Long-distance Bell-type tests using energy-time entangled photons," Physical Review A, 59(6):4150-4163 (1999).

Walker, J.A., "Telecommunications Applications of MEMS," mstnews, pp. 6-9 (Mar. 2000).

Xiao, L., et al., "Efficient Multi-Party Quantum Secret Sharing Schemes," pp. 1-7 (May 28, 2004).

Degermark, M., et al., "Small Forwarding Tables for Fast Routing Lookups," ACM, pp. 3-14 (1997).

Estrin, D., et al., "Security Issues in Policy Routing," IEEE, pp. 183-193 (1989).

Garcia-Luna-Aceves, J.J., et al., "Distributed, Scalable Routing Based on Vectors of Link States," IEEE Journal on Selected Areas in Communications, 13(8):1383-1395 (Oct. 1995).

Garcia-Luna-Aceves, J.J., et al., "Scalable Link-State Internet Routing," Network Protocols (Oct. 13-16, 1998).

Lakshman, T.V., et al., "High-Speed Policy-based Packet Forwarding Using Efficient Multi-dimensional Range Matching," Proceedings of the ACM SIGCOMM'98 conference on Applications, technologies, architectures and protocols for computer communication, pp. 203-214 (1998).

Lampson, B., et al., "IP Lookups Using Multiway and Multicolumn Search," IEEE/ACM Transactions on Networking, 7(3):324-334 (Jun. 1999).

Ramanathan, R., et al., "Hierarchically-organized, multihop mobile wireless networks for quality-of-service support," Mobile Networks and Applications, 3:101-119 (1998).

Tsai, W.T., "An Adaptive Hierarchical Routing Protocol," IEEE Transactions on Computers, 38(8):1059-1075 (Aug. 1989).

Waldvogel, M., et al., "Scalable High Speed IP Routing Lookups," ACM, pp. 25-36 (1997).

Bowers, J.E., "Optical Network and Component Trends," UCSB, NSF Workshop, 51 pages.

Honjo, T., et al., "Differential-phase-shift Quantum Key Distribution," NTT Technical Review, 2(12):26-33 (Dec. 2004).

Nambu, Y., et al., "BB84 Quantum Key Distribution System based on Silica-Based Planar Lightwave Circuits," Fundamental and Environmental Research Laboratories and Fiber Optic Devices Division, pp. 1-11.

Paniccia, M., "Silicon Integrated Photonics," UCSB, 30 pages, Feb. 2, 2005.

Tomita, A., et al., "Recent Progress in Quantum Key Transmission," NEC J. of Adv. Tech., 2(1):84-91 (Winter 2005).

Collins, G.; "Quantum Cryptography Defies Eavesdropping"; Physics Today; Nov. 1992; pp. 21-23.

"Quantum Public Key Distribution System"; IBM Technical Disclosure Bulletin; vol. 28, No. 7; Dec. 7, 1985; pp. 3153-3163.

P.D. Townsend et al.; "Single Photon Interference in 10 km Long Optical Fibre Interferometer"; Electronics Letters; vol. 29, No. 7; Apr. 1993; pp. 834-835.

P.D. Townsend et al.; "Enhanced Single Photon Fringe Visibility in a 10 km Long Prototype Quantum Cryptography Channel"; Electronics Letters; vol. 29, No. 14; Jul. 1993; pp. 1291-1293.

P.D. Townsend et al.; "Secure Key Distribution System Based on Quantum Cryptography"; Electronics Letters; vol. 30, No. 10; May 1994; pp. 809-811.

Phoenix et al.; "Multi-User Quantum Cryptography on Optical Networks"; Journal of Modern Optics; vol. 42, No. 6; Jun. 1995; pp. 1155-1163.

Franson, J.D.; "Violations of a New Inequality for Classical Fields"; Johns Hopkins University; NTIS NASA publication; Goddard Space Flight Center; Workshop on Squeezed States and Uncertainty Relations; Feb. 1992; pp. 23-32.

Bennett et al.; "Experimental Quantum Cryptography"; Sep. 1991; pp. 1-28.

Slutsky et al.; "Defense frontier analysis of quantum cryptographic systems"; Applied Optics; vol. 37, No. 14; May 10, 1998; pp. 2869-2878.

Bennett, C.H., "Quantum Cryptography Using Any Two Nonorthogonal States," Physical Review Letters, 68(21):3121-3124 (1992).

Bennett, C.H., et al., "Experimental Quantum Cryptography," J. Cryptology, 5:3-28 (1992).

Butler, W.T., et al. "Free space quantum-key distribution," Physical Review A, 57(4):2379-2382 (Apr. 1998).

Jacobs, B.C., et al., "Quantum cryptography in free space," Optics Letters, 21(22):1854-1856 (Nov. 1996).

Bethune, D.S., et al., An Autocompensating Fiber-Optic Quantum Cryptography System Based on Polarization Splitting of Light, IEEE Journal of Quantum Electronics; 36(3):340-347 (2000).

Imamoglu, A., et al., "Turnstile Device for Heralded Single Photons: Coulomb Blockade of Electron and Hole Tunneling in Quantum Confined p-i-n Heterojunctions," Physical Review Letters, 72(2):210-213 (1994).

Office action issued on Sep. 6, 2007 for U.S. Appl. No. 10/803,509.
Office action issued on Jul. 10, 2007 for U.S. Appl. No. 10/795,313.
Office action issued on May 25, 2007 for U.S. Appl. No. 10/218,652.
Office action issued on Oct. 29, 2007 for U.S. Appl. No. 10/786,314.
Office action issued on Oct. 11, 2007 for U.S. Appl. No. 10/795,398.
Office action issued on Dec. 27, 2007 for U.S. Appl. No. 10/795,313.

* cited by examiner

SYSTEMS AND METHODS FOR MANAGING QUANTUM CRYPTOGRAPHIC NETWORKS

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Project Agency (DARPA).

INCORPORATION BY REFERENCE

The present application relates to co-pending application Ser. No. 09/943,709, entitled "Systems and Methods for Path Set-Up in a Quantum Key Distribution Network," filed on Aug. 31, 2001; and co-pending application Ser. No. 09/944,328, entitled "Quantum Cryptographic Key Distribution Networks with Untrusted Switches," filed on Aug. 31, 2001. The disclosures of the co-pending applications are incorporated by reference herein in their entirety.

FIELD OF THE INVENTION

The present invention relates generally to cryptographic systems and, more particularly, to systems and methods for managing quantum cryptographic networks.

BACKGROUND OF THE INVENTION

Conventional packet-switching networks permit cheap and reliable communications independent of the distance between a source node and a destination node in the network. These conventional networks often rely upon either public keys or shared private keys to provide privacy for messages that pass through the network's links. Public key cryptographic systems have the drawback that they have never been proven to be difficult to decipher. Therefore, it is possible that a method of efficiently cracking public key systems may one day be discovered. Such a discovery could make all public key technology obsolete. All supposedly "secure" networks based on public key technology would thus become vulnerable. Shared private keys also have the drawback that the logistics of distributing the private keys can be prohibitive.

Quantum cryptography represents a recent technological development that provides for the assured privacy of a communications link. Quantum cryptography is founded upon the laws of quantum physics and permits the detection of eavesdropping across a link. Quantum cryptographic techniques have been conventionally applied to distribute keys from a single photon source to a single photon detector, either through fiber optic strands or through the air. Although this approach is perfectly feasible for scientific experiments, it does not provide the kind of "anyone to anyone" connectivity that is provided by current communications technology. Conventional quantum cryptographic techniques require a direct connection to anyone with whom one wishes to exchange keying material. Obviously, a large system built along these lines would be impractical, since it would require every person to have enough sources and/or detectors, and fiber strands so that they could employ a dedicated set of equipment for each party with whom they intend to communicate.

Furthermore, conventional quantum cryptographic techniques fail to adequately handle the situations in which eavesdropping is present on a link or when a dedicated link fails (e.g., a fiber is accidentally cut). In conventional quantum cryptographic techniques, further key distribution across the dedicated link becomes impossible until eavesdropping on the link ceases or the link is repaired.

It would, thus, be desirable to implement a quantum cryptographic network that could provide the "any to any" connectivity of conventional packet-switching networks, such as the Internet, while eliminating the need for a direct connection between parties distributing quantum key material, and which may further sustain key distribution even with link failure and/or when eavesdropping exists on the link. Conventional packet-switching networks have employed numerous different types of network management protocols and systems for configuring and managing the nodes of the networks. In a quantum cryptographic network that provides "any to any" connectivity, network management protocols and systems may be employed to assist in building and maintaining a multi-node, multi-link quantum cryptographic network. A quantum cryptographic network with network management functionality may be more easily configured, monitored and actively managed.

Therefore, there exists a need for systems and methods that can provide network management functionality for configuring, monitoring and managing links and nodes of quantum cryptographic networks.

SUMMARY OF THE INVENTION

Systems and methods consistent with the present invention address this and other needs by interconnecting one or more network management terminals with the nodes of a quantum cryptographic network for configuring and managing the operational parameters associated with the nodes and links of the network. The one or more network management terminals may configure and initialize the nodes and links of the quantum cryptographic network. The network management terminal(s) may further monitor parameters associated with quantum key distribution (QKD) at each node of the quantum cryptographic network. The network management terminal(s) may also actively control the nodes and links of the quantum cryptographic network based on the monitored parameters. The network management terminal(s) may further provide graphical and/or textual displays of monitored parameters such that network management entities may be apprised of a current state of nodes and links in the network.

In accordance with the purpose of the invention as embodied and broadly described herein, a method of performing network management in a quantum cryptographic network includes monitoring parameters associated with at least one of multiple links and multiple nodes of the quantum cryptographic network. The method further includes managing the multiple links and multiple nodes of the quantum cryptographic network based on the monitored parameters.

In a further implementation consistent with the present invention, a method of controlling at least one quantum cryptographic parameter associated with at least one node of multiple nodes of a quantum cryptographic network includes sending a message to the at least one node of the multiple nodes via a communications network. The method further includes selectively controlling the at least one quantum cryptographic parameter via the message.

In an additional implementation consistent with the present invention, a method of notifying a quantum cryptographic network management device of an occurrence of one or more events at least one node of a quantum cryptographic network includes determining the occurrence of the one or more events at the at least one node. The method further includes notifying the quantum cryptographic network management device of the one or more events.

In yet another implementation consistent with the present invention, a method of displaying quantum cryptographic parameters associated with multiple nodes in a quantum cryptographic network includes monitoring quantum cryptographic parameters associated with the multiple nodes. The method further includes displaying the monitored quantum cryptographic parameters in at least one of textual and graphical form at a remote location.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods consistent with the present invention provide mechanisms for configuring, monitoring and actively managing nodes and links of a quantum cryptographic network. Consistent with the present invention, one or more network management terminals may be interconnected with the nodes of a quantum cryptographic network for configuring and managing operational parameters associated with the nodes and links of the network. The network management terminals may, thus, assist in managing the nodes and links of the quantum cryptographic network to ensure that the desired "any to any" connectivity is maintained.

Exemplary Network

Figure 1:
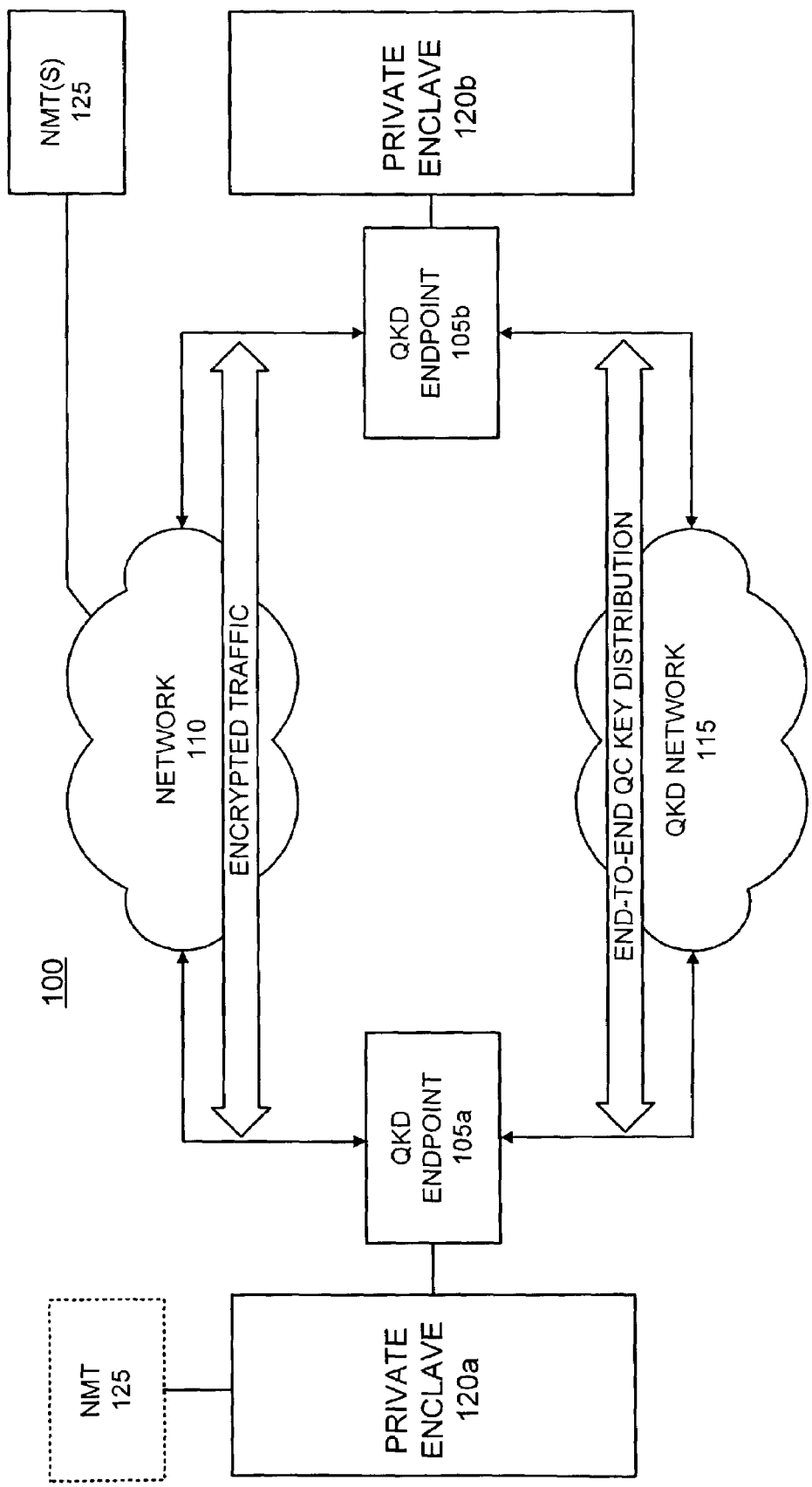
FIG. 1 illustrates an exemplary network in which systems and methods, consistent with the present invention, may be implemented.

FIG. 1 illustrates an exemplary network 100 in which systems and methods for distributing encryption keys via quantum cryptographic mechanisms, consistent with the present invention, may be implemented. Network 100 may include QKD endpoints 105a and 105b connected via sub-network 110 and QKD sub-network 115. Two QKD endpoints 105a and 105b are shown by way of example only and network 100 may include multiple QKD endpoints 105 connected via sub-network 110 and QKD sub-network 115.

QKD endpoints 105a and 105b may each include a host or a server. QKD endpoints 105a and 105b that include servers may further connect to private enclaves 120. Each private enclave 120 may include local area networks (LANs) (not shown) interconnected with one or more hosts (not shown). Sub-network 110 can include one or more circuit-switched or packet-switched networks of any type, including a Public Land Mobile Network (PLMN), Public Switched Telephone Network (PSTN), LAN, metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks.

QKD sub-network 115 may include one or more QKD switches (not shown) for distributing encryption keys between a source QKD endpoint (e.g., QKD endpoint 105a) and a destination QKD endpoint (e.g., QKD endpoint 105b). The QKD switches of QKD sub-network 115 may include trusted or untrusted switches. Trusted QKD switches include QKD switches that consist of a known level of security. Untrusted QKD switches include QKD switches that are either unsecure, or are of an unverifiable level of security.

Subsequent to quantum key distribution via QKD network 115, QKD endpoint 105a and QKD endpoint 105b may encrypt traffic using the distributed key(s) and transmit the traffic via sub-network 110. Network 100 may further include one or more network management terminals (NMTs) 125. NMT(s) 125 may interconnect with one or more private enclaves 120 and/or sub-network 110. NMT(s) 125 may configure, initialize, and actively control the QKD switches (not shown) and QKD endpoints 105 of network 100.

Exemplary QKD Network

Figure 2:
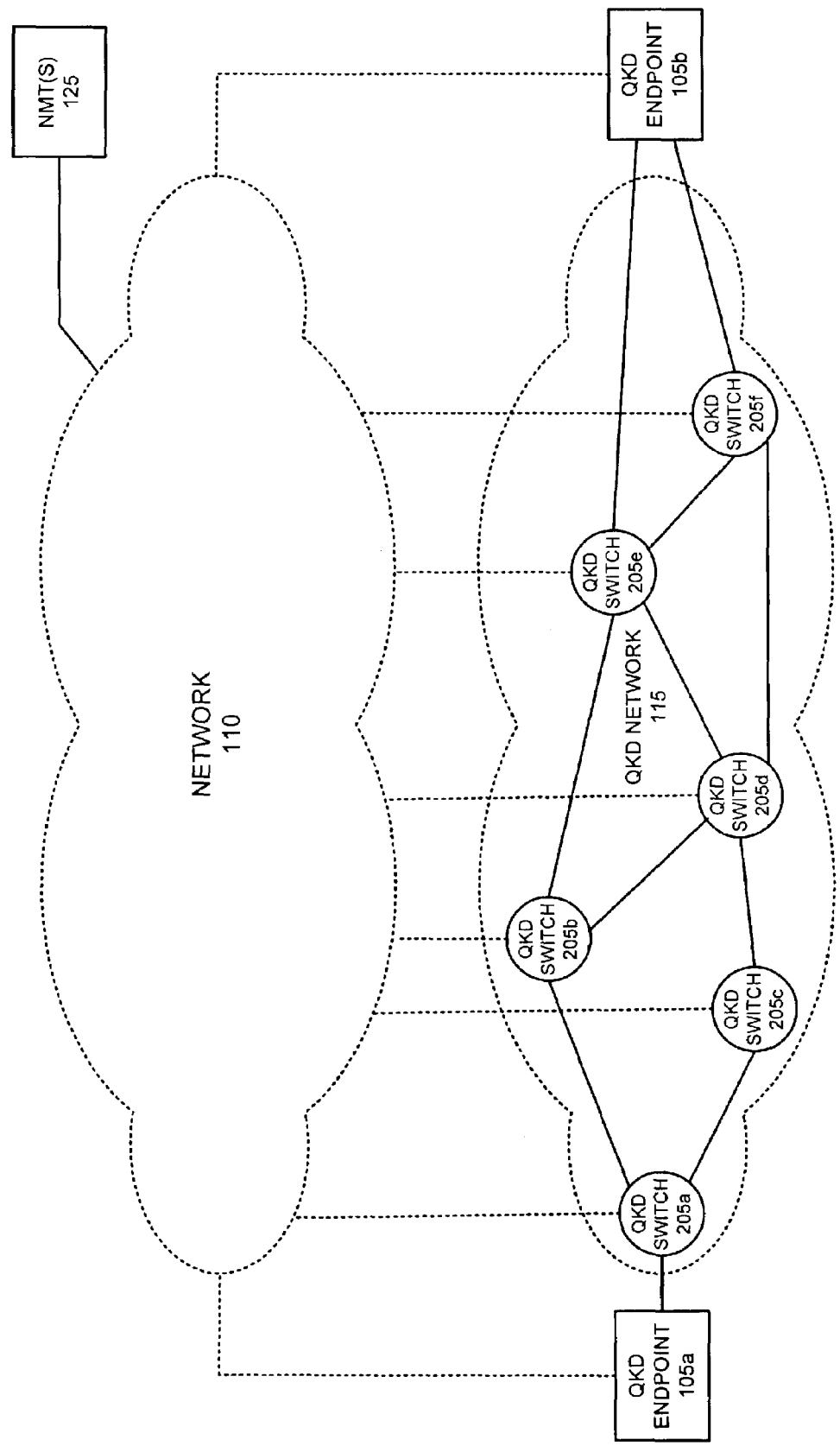
FIG. 2 illustrates exemplary components of the QKD network of FIG. 1 consistent with the present invention.

FIG. 2 illustrates an exemplary diagram, consistent with the present invention, that depicts QKD switches 205 of QKD sub-network 115. QKD sub-network 115 may include one or more QKD switches 205a-205f interconnected via one or more links that may carry light throughout the electromagnetic spectrum, including light in the human-visible spectrum and light beyond the human-visible spectrum, such as, for example, infrared or ultraviolet light. The interconnecting links may include, for example, conventional optical fibers. Alternatively, the interconnecting links may include free-space optical paths, such as, for example, through the atmosphere or outer space, or even through water or other transparent media. As another alternative, the interconnecting links may include hollow optical fibers that may be lined with photonic band-gap material. As shown in FIG. 2, QKD endpoints 105a and 105b may each connect with one or more QKD switches of QKD sub-network 115. Each QKD switch 205 may connect with sub-network 110 such that NMT(s) 125 can individually control each of QKD switches 205.

Exemplary Network Management Terminal

Figure 3:
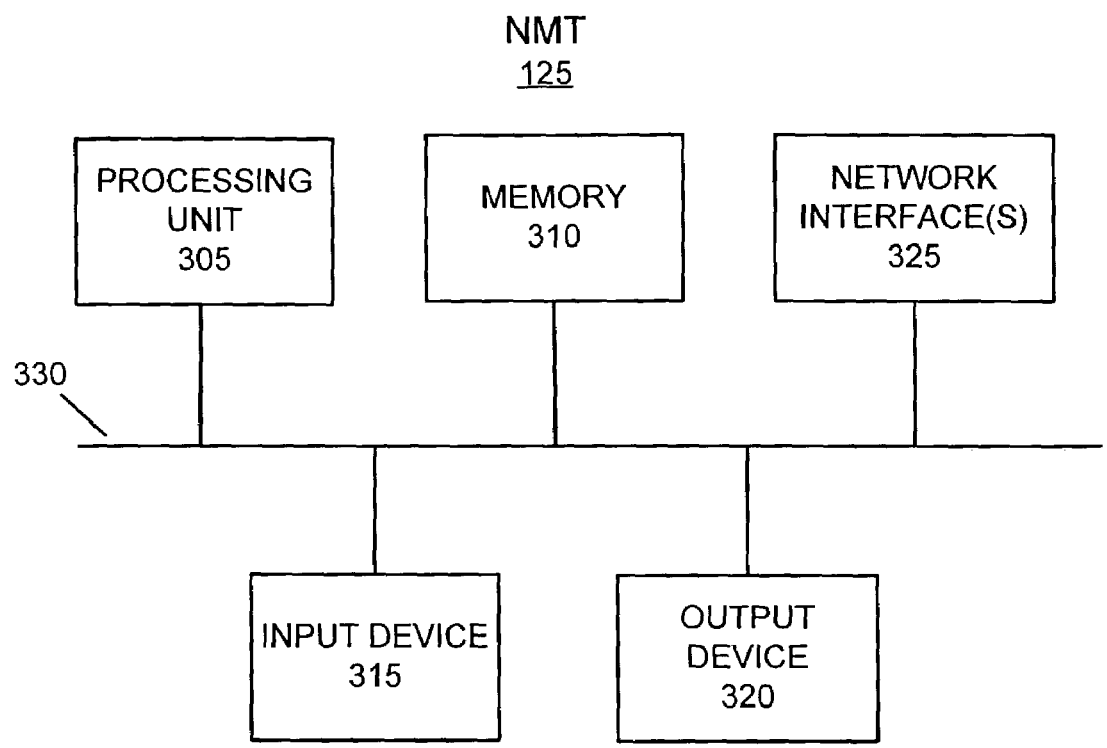
FIG. 3 illustrates exemplary components of a network management terminal consistent with the present invention.

FIG. 3 illustrates exemplary components of an NMT 125. NMT 125 may include a processing unit 305, a memory 310, an input device 315, an output device 320, a network interface(s) 325 and a bus 330. Processing unit 305 may perform all data processing functions for inputting, outputting, and processing of NMT data. Memory 310 may include Random Access Memory (RAM) that provides temporary working storage of data and instructions for use by processing unit 305 in performing processing functions. Memory 310 may additionally include Read Only Memory (ROM) that provides permanent or semi-permanent storage of data and instructions for use by processing unit 305. Memory 310 can also include large-capacity storage devices, such as a magnetic and/or optical recording medium and its corresponding drive.

Input device 315 permits entry of data into NMT 125 and may include a user interface (not shown). Output device 320 permits the output of data in video, audio, or hard copy format. Network interface(s) 325 may interconnect NMT 125 with sub-network 110 or a private enclave 120. Bus 330 interconnects the various components of NMT 125 to permit the components to communicate with one another.

Exemplary Management Information Database

Figure 4:
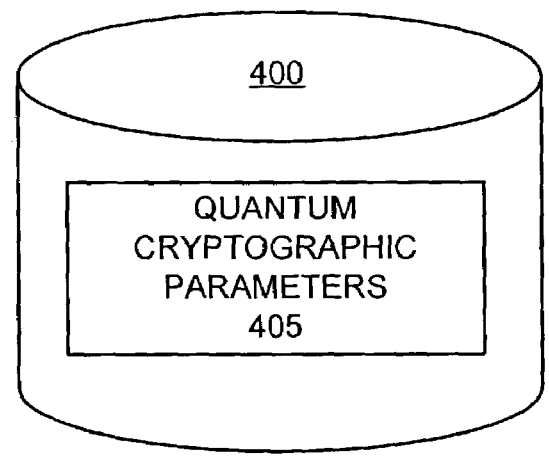
FIG. 4 illustrates an exemplary management information database associated with the network management terminal of FIG. 3 consistent with the present invention.

FIG. 4 illustrates an exemplary management information database (MID) 400 that may be associated with an NMT 125 consistent with the present invention. MID 400 may be stored in memory 310 of NMT 125, or may be located externally to NMT 125. MID 400 may include multiple records, each record associated with different QKD endpoints 105 of network 100. Each record of MID 400 may include an identifier associated with a QKD switch 205, or a network address associated with a QKD endpoint 105. Each record may further include numerous parameters associated with a respective QKD switch 205 or QKD endpoint 105. Such parameters may include, but are not limited to, the speed at which lasers and detectors of respective QKD endpoints 105 are operating, a quantum cryptographic protocol used across any given link of network 100, one or more wavelengths currently being used at a respective QKD endpoint 105, a number of QKD bits in frames transmitted from a respective QKD endpoint 105, a network address associated with a respective QKD endpoint 105, and device failure indications associated with a respective QKD endpoint 105 or QKD switch 205. Such parameters may further include out of range conditions associated with the operation of a respective QKD endpoint 105, high or low Quantum bit error rates (QBER) associated with a respective QKD endpoint 105, high or low photon detection rates associated with a respective QKD endpoint 105, a number of QKD bits available in a respective QKD endpoint 105, and how many QKD bits/second are currently being produced in a respective QKD endpoint 105. The parameters may also include how many QKD bits/second are currently being consumed in a respective QKD endpoint 105, how many different security associations (SAs) are currently active in a respective QKD endpoint 105, and one or more temperatures associated with devices in a respective QKD endpoint 105.

Exemplary QKD Endpoint

Figure 5A:
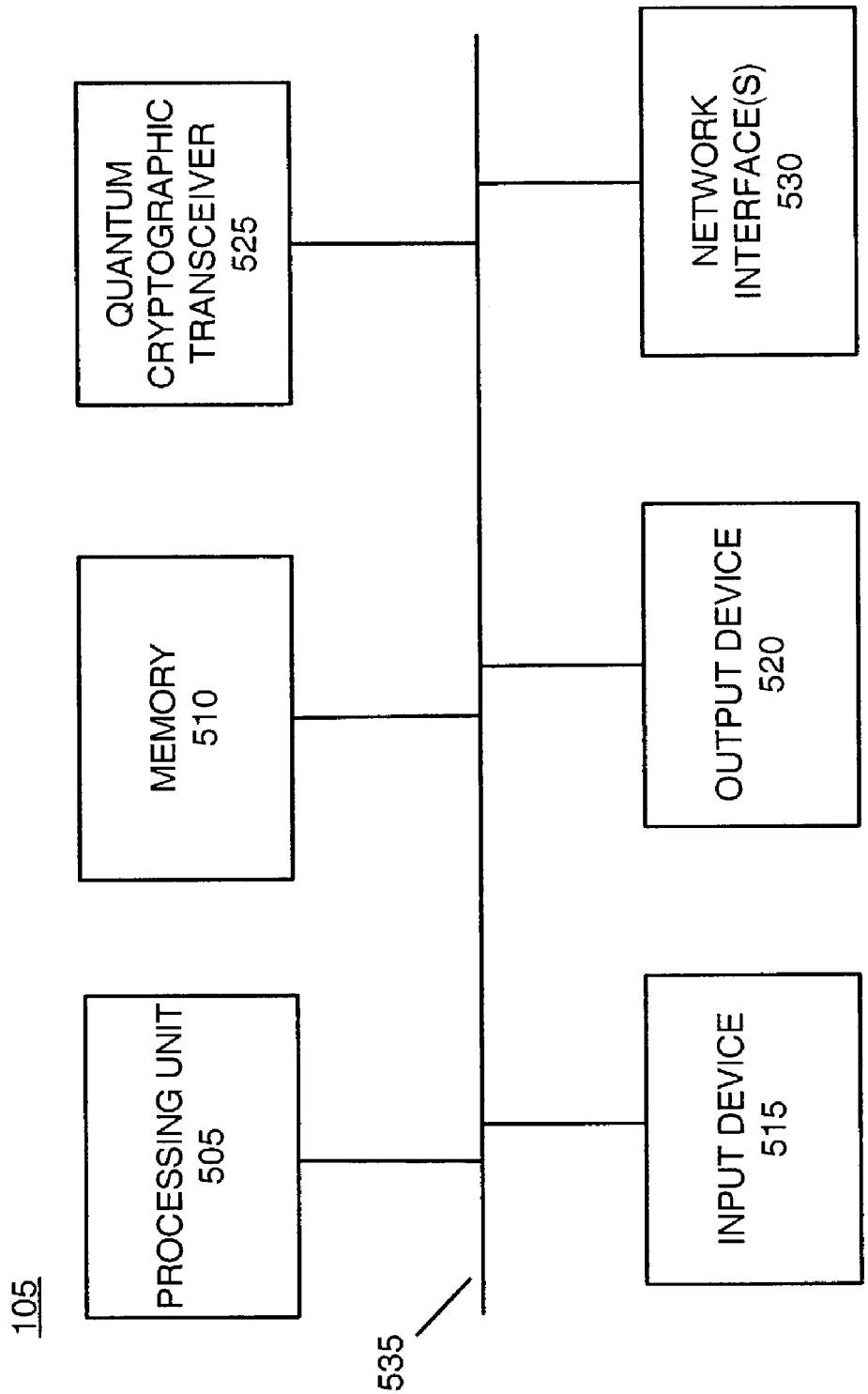
FIG. 5A illustrates an exemplary configuration of a QKD endpoint consistent with the present invention.

FIG. 5A illustrates exemplary components of a QKD endpoint 105 consistent with the present invention. QKD endpoint 105 may include a processing unit 505, a memory 510, an input device 515, an output device 520, a quantum cryptographic transceiver 525, a network interface(s) 530 and a bus 535. Processing unit 505 may perform all data processing functions for inputting, outputting, and processing of QKD endpoint data. Memory 510 may include RAM that provides temporary working storage of data and instructions for use by processing unit 505 in performing processing functions. Memory 510 may additionally include ROM that provides permanent or semi-permanent storage of data and instructions for use by processing unit 505. Memory 510 can also include large-capacity storage devices, such as a magnetic and/or optical recording medium and its corresponding drive.

Input device 515 permits entry of data into QKD endpoint 105 and may include a user interface (not shown). Output device 520 permits the output of data in video, audio, or hard copy format. Quantum cryptographic transceiver 525 may include conventional mechanisms for transmitting and receiving encryption keys using quantum cryptographic techniques.

Figure 5B:
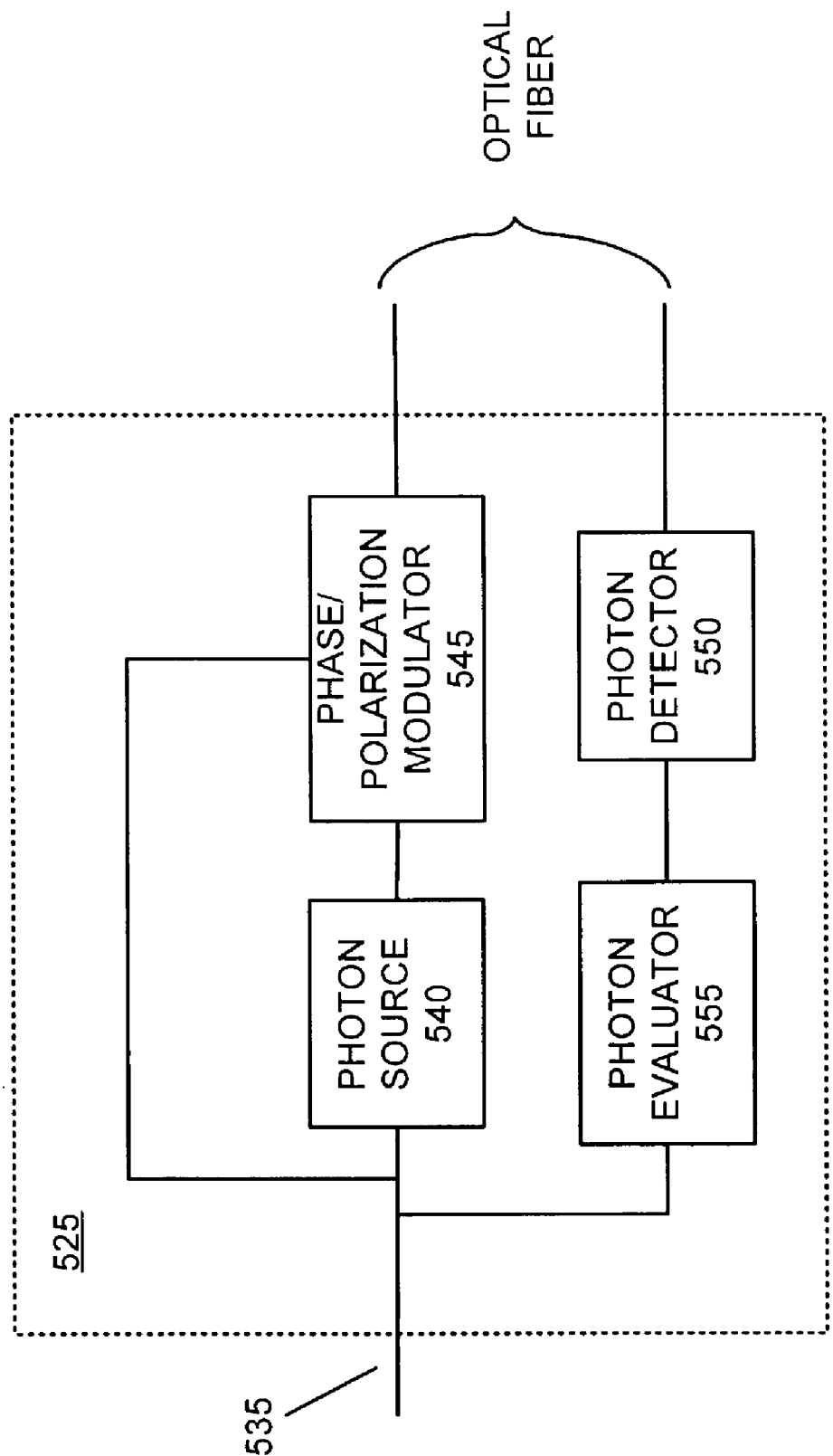
FIG. 5B illustrates exemplary components of the quantum cryptographic transceiver of FIG. 5A consistent with the present invention.

FIG. 5B illustrates exemplary components of quantum cryptographic transceiver 525. Quantum cryptographic transceiver 525 may include a photon source 540, a phase/polarization modulator 545, a photon detector 550, and a photon evaluator 555. Photon source 540 can include, for example, a conventional laser. Photon source 540 may produce photons according to instructions provided by processing unit 505. Photon source 540 may produce photons of light with wavelengths throughout the electromagnetic spectrum, including light in the human-visible spectrum and light beyond the human-visible spectrum, such as, for example, infrared or ultraviolet light.

Phase/polarization modulator 545 can include, for example, conventional Mach-Zehnder interferometers. Phase/polarization modulator 545 encodes outgoing photons from the photon source according to commands received from processing unit 505 for transmission across an optical link. Photon detector 550 can include, for example, conventional avalanche photo detectors (APDs) or conventional photo-multiplier tubes (PMTs). Photon detector 550 can detect photons received across the optical link. Photon evaluator 555 can include conventional circuitry for processing and evaluating output signals from photon detector 550 in accordance with conventional quantum cryptographic techniques.

Returning to FIG. 5A, network interface(s) 530 may interconnect QKD endpoint 105 with sub-network 110 or private enclave 120. Bus 535 interconnects the various components of QKD endpoint 105 to permit the components to communicate with one another.

Exemplary QKD Endpoint Functional Block Diagram

Figure 6:
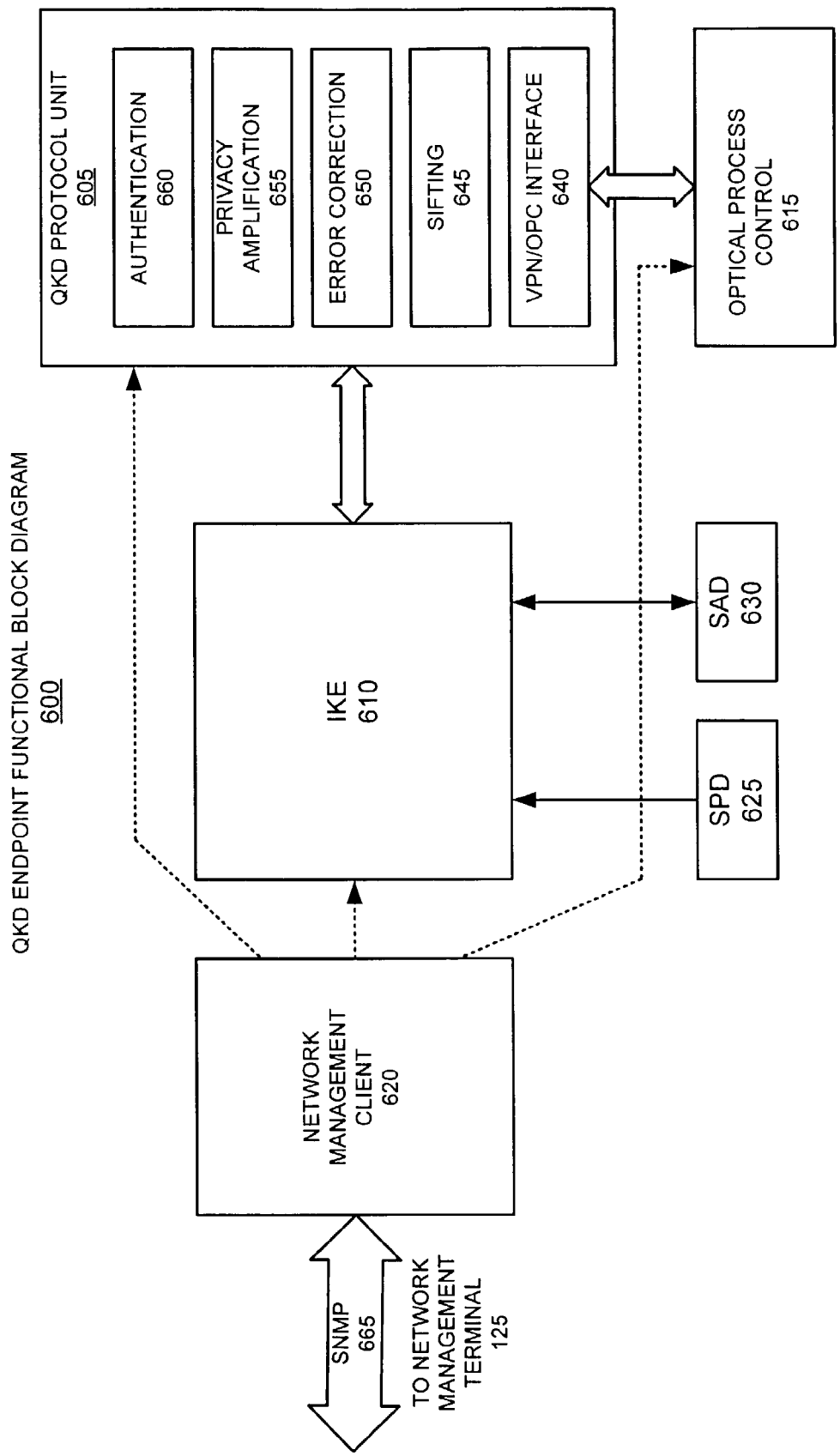
FIG. 6 illustrates an exemplary functional block diagram of a QKD endpoint consistent with the present invention.

FIG. 6 illustrates a diagram of an exemplary functional block diagram 600 of a QKD endpoint 105 consistent with the present invention. Functional block diagram 600 may include a QKD protocol unit 605, Internet Key Exchange protocol (IKE) 610, optical process control 615, network management client 620, security policy database (SPD) 625, and security association database (SAD) 630. QKD protocol unit 605 may further be comprised of an interface layer 640, a sifting layer 645, an error correction layer 650, a privacy amplification layer 655 and an authentication layer 660. The interface layer 640 may include protocols for deriving QKD symbols from photons transmitted via QKD network 115 and received at a quantum cryptographic transceiver 525 of a QKD endpoint 105. Values of the QKD symbols (e.g., high or low symbol values) may be interpreted at layer 640 by the polarization, phase or energy states of incoming photons. Interface layer 640 may measure the polarization, phase or energy state of each received photon and interpret the measurement as corresponding to whether a first detector fired, a second detector fired, both first and second detectors fired, neither detector fired, or any other relevant measurements such as the number of photons detected.

Sifting layer 645 may implement protocols for discarding or "sifting" certain of the raw symbols produced by layer 640. The protocols of sifting layer 645 may exchange basis information between the parties to a QKD symbol exchange. As an example, when QKD endpoint 105a receives polarized photons from QKD endpoint 105b, sifting layer 645 may measure the polarization of each photon along either a rectilinear or diagonal basis with equal probability. Sifting layer 645 may record the basis that is used for measuring the polarization of each photon. Sifting layer 645 may inform QKD endpoint 105b the basis chosen for measuring the polarization of each photon. QKD endpoint 105b may then, via the protocols of sifting layer 645, inform QKD endpoint 105a, whether it has made the polarization measurement along the correct basis. QKD endpoint 105a and 105b may then "sift" or discard all polarization measurements in which QKD endpoint 105a has made the measurement along the wrong basis and keep only the measurements in which QKD endpoint 105a has made the measurement along the correct basis. For example, if QKD endpoint 105b transmits a photon with a symbol encoded as a 0° polarization and if QKD endpoint 105a measures the received photon via a diagonal basis (45°-135°), then QKD endpoint 105b and 105a will discard this symbol value since QKD endpoint 105a has made the measurement along the incorrect basis.

Error correction layer 650 may implement protocols for correcting errors that may be induced in transmitted photons due to, for example, the intrinsic noise of the quantum channel. Layer 650 may implement parity or cascade checking, convolutional encoding or other known error correction processes. Error correction layer 650 may additionally implement protocols for determining whether eavesdropping has occurred on the quantum channel. Errors in the states (e.g., polarization, phase or energy) of received photons may occur if an eavesdropper is eavesdropping on the quantum channel. To determine whether eavesdropping has occurred during transmission of a sequence of photons, QKD endpoint 105a and QKD endpoint 105b may randomly choose a subset of photons from the sequence of photons that have been transmitted and measured on the same basis. For each of the photons of the chosen subset, QKD endpoint 105b publicly announces its measurement result. QKD endpoint 105a then informs QKD endpoint 105b whether its result is the same as what was originally sent. QKD endpoint 105a and 105b both may then compute the error rate of the subset of photons. If the computed error rate is higher than an agreed upon tolerable error rate (typically about 15%), then QKD endpoint 105a and 105b may infer that substantial eavesdropping has occurred. They may then discard the current polarization data and start over with a new sequence of photons.

Privacy amplification layer 655 may implement protocols for reducing error-corrected symbols received from layer 650 to a small set of derived symbols (e.g., bits) to reduce an eavesdropper's knowledge of the key. If, subsequent to sifting and error correction, QKD endpoint 105a and 105b have adopted n symbols as secret symbols, then privacy amplification layer 655 may compress the n symbols using, for example, a hash function. QKD endpoint 105a and 105b may agree upon a publicly chosen hash function $f$ and take K $f$(n symbols) as the shared r-symbol length key K. The hash function randomly redistributes the n symbols such that a small change in symbols produces a large change in the hash value. Thus, even if an eavesdropper determines a number of symbols of the transmitted key through eavesdropping, and also knows the hash function $f$, they still will be left with very little knowledge regarding the content of the hashed r-symbol key K.

Authentication layer 660 may implement protocols for authenticating transmissions between QKD endpoint 105a and 105b via network 110. Such protocols may include any conventional authentication mechanisms known to one skilled in the art (e.g., message authentication codes (MACs)).

IKE protocol 610 may implement key exchange protocols and algorithms. Optical process control 615 may control opto-electronics of quantum cryptographic transceiver 525. In exemplary embodiments that use framing, optical process control 615 may impose the framing on the QKD link. Optical process control 615 may continuously transmit and receive frames of QKD symbols and report the results to QKD protocol suite 605. Network management client 620 may communicate with NMT 125 using a network management protocol, such as, for example, Simple Network Management Protocol (SNMP) 665. Other protocols such as CMIP, telnet, or CORBA may also be used. The network management protocol may, for example, receive commands (e.g., GET commands) from NMT 125 about specific controllable items to determine the current value of some parameter. The network management protocol of client 620 may also, for example, receive commands from NMT 125 to change parameter settings. Network management client 620 may communicate internally, via remote procedure calls or other means, to other software entities within QKD endpoint 105.

SPD 625 may include a database, together with algorithms, that classify received data units to determine which data belong in which security associations. This may be accomplished by matching various fields in the received data units with rule sets in the database. SAD 630 may include a database, together with algorithms, that perform Internet Protocol Security (IPsec) on data units as needed for a given security association (e.g., encryption, decryption, authentication, encapsulation).

Exemplary QKD Switch

Figure 7:
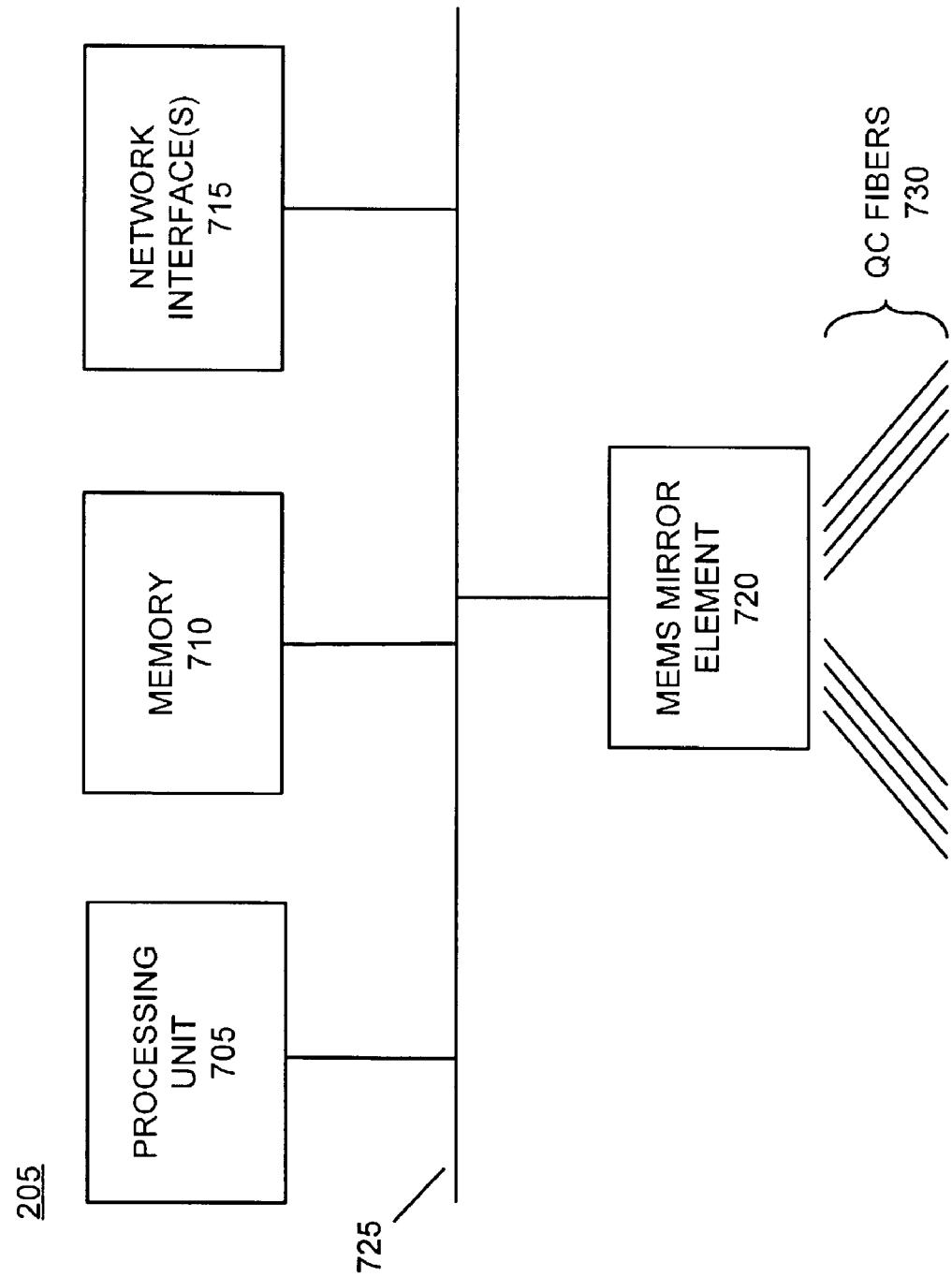
FIG. 7 illustrates an exemplary configuration of an untrusted QKD switch consistent with the present invention.

FIG. 7 illustrates exemplary components of a QKD switch 205 consistent with the present invention. QKD switch 205 may include a processing unit 705, a memory 710, a network interface(s) 715, a Micro-Electro-Mechanical Systems (MEMS) mirror element 720, and a bus 725. MEMS mirror element 720 may be interconnected with one or more links that may include quantum cryptographic (QC) fibers 730.

Processing unit 705 may perform all data processing functions for inputting, outputting, and processing of QKD switch data. Memory 710 may include RAM that provides temporary working storage of data and instructions for use by processing unit 705 in performing processing functions. Memory 710 may additionally include ROM that provides permanent or semi-permanent storage of data and instructions for use by processing unit 705. Memory 710 can also include large-capacity storage devices, such as a magnetic and/or optical recording medium and its corresponding drive.

Network interface(s) 715 interconnects QKD switch 205 with sub-network 110. MEMS mirror element 720 may include an array of optical switching mirrors such as, for example, any of those disclosed in U.S. Pat. Nos. 5,960,133; 5,960,131; 6,005,993; 6,154,5,86; and 5,911,018. MEMS mirror element 720 directs photons, containing quantum encryption keys encoded via phase and/or polarization states, through a path along a fiber of QC fibers 730 in QKD sub-network 115 according to instructions from processing unit 705. Bus 725 interconnects the various components of QKD switch 205 to permit the components to communicate with one another. QC fibers 730 may include one or more optical fibers.

Exemplary Quantum Key Distribution

Figure 8:
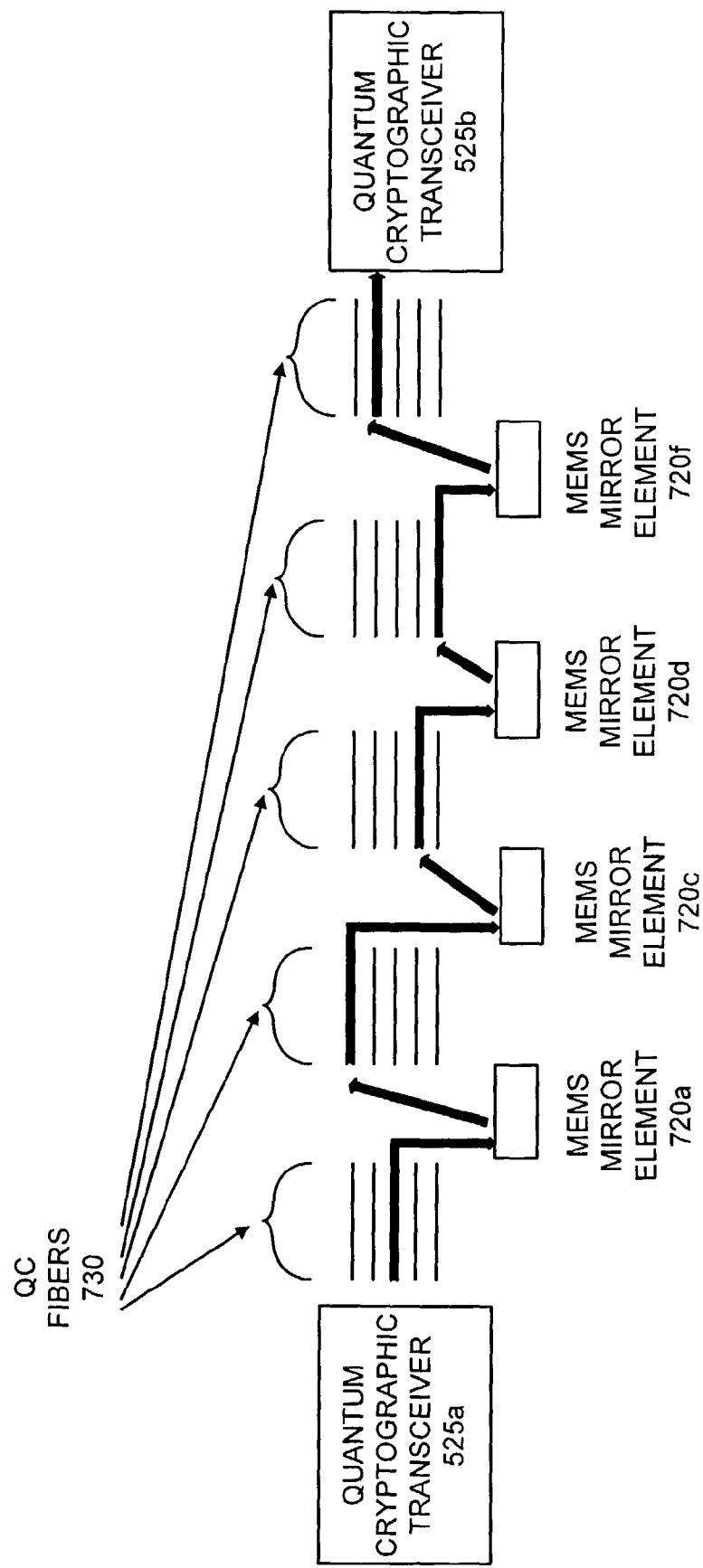
FIG. 8 illustrates an exemplary quantum key distribution process consistent with the present invention.

FIG. 8 illustrates exemplary quantum key distribution from QKD endpoint 105*a* to QKD endpoint 105*b*, via QKD sub-network 115 using QKD switch 205 MEMS mirror elements 720, consistent with the present invention. To distribute an encryption key, quantum cryptographic transceiver 525*a* at QKD endpoint 105*a* transmits photons through a path along QC fiber links 730 interconnecting, for example, QKD switches 205*a*, 205*c*, 205*d* and 205*f* and quantum cryptographic transceiver 525*b* at QKD endpoint 105*b*. At each QKD switch 205, a MEMS mirror element 720 directs the incoming photon to an appropriate outbound QC fiber link in accordance with techniques disclosed in co-pending application Ser. No. 09/944,328, entitled "Quantum Cryptographic Key Distribution Networks with Untrusted Switches."

Exemplary QKD Endpoint Configuration and Initialization Process

Figure 9:
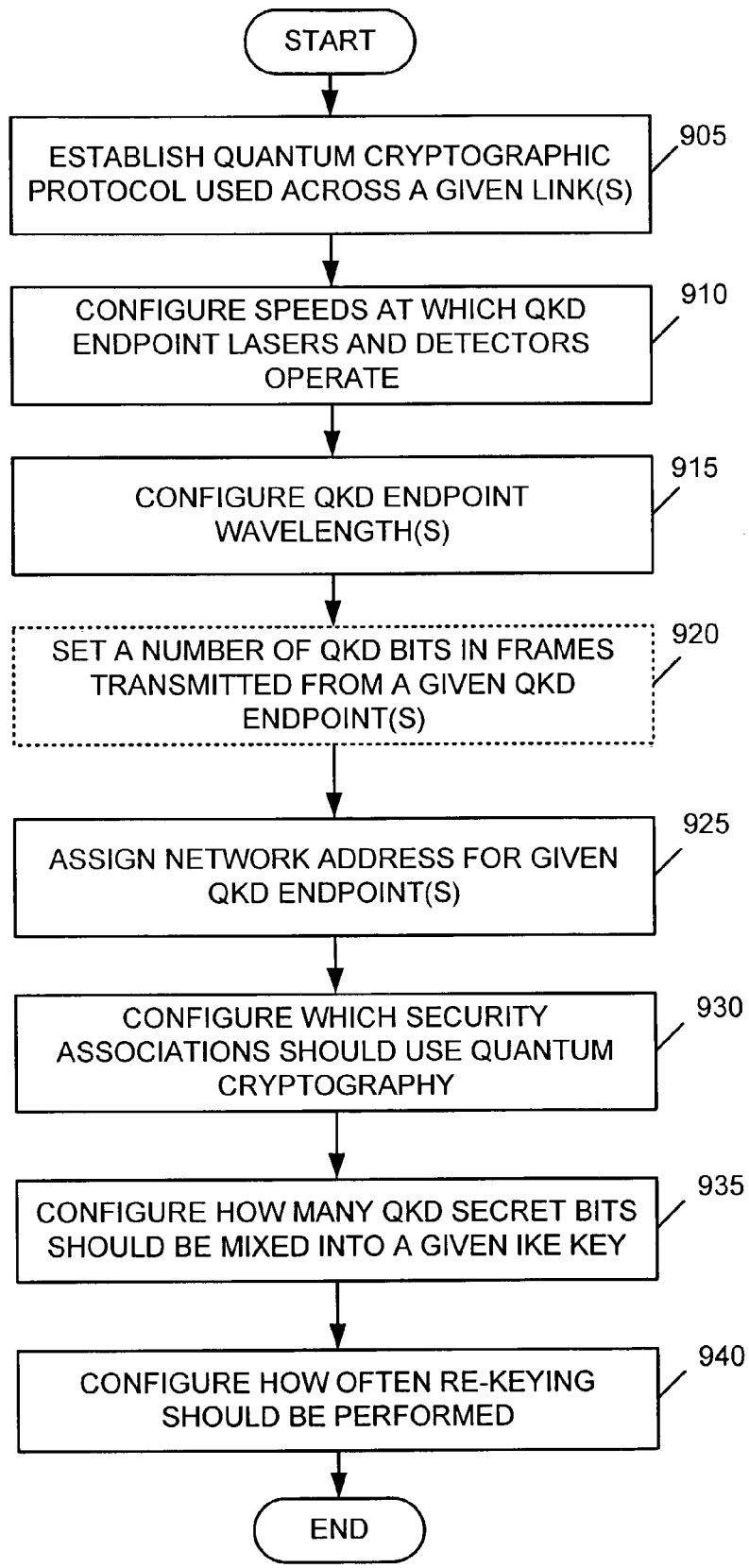
FIG. 9 is a flow chart that illustrates an exemplary QKD configuration and initialization process consistent with the present invention.

FIG. 9 is a flowchart that illustrates an exemplary process, consistent with the present invention, for configuring and initializing, from an NMT 125, QKD switches 205 and QKD endpoints 105 of network 100. As one skilled in the art will appreciate, the method exemplified by FIG. 9 can be implemented as a sequence of instructions and stored in memory 310 of NMT 125 for execution by processing unit 305.

The exemplary process may begin with the establishment of quantum cryptographic protocols used across given links of QKD sub-network 115 [act 905]. NMT 125 may, for example send messages to selected QKD switches 205 and/or QKD endpoints 105 of network 100 to establish a quantum cryptographic protocol across a given link. Such quantum cryptographic protocols may include any conventional QKD protocol, such as, for example, BB84 or B92. NMT 125 may configure the speeds at which QKD endpoint 105 lasers and detectors may operate [act 910]. NMT 125 may, for example, send messages to selected QKD endpoints 105 to configure the laser and detector speeds. NMT 125 may further configure the wavelengths at which QKD endpoints 105 of network 100 transmit [act 915]. Any given QKD endpoint 105 may have the capability to transmit at multiple wavelengths and NMT 125 may select one or more wavelengths of the multiple wavelengths at which the QKD endpoint 105 should transmit. NMT 125 may send messages to selected QKD endpoints 105 to select the one or more wavelengths. NMT 125 may, optionally, for QKD endpoints 105 that distribute quantum cryptographic keys via frames, set a number of bits in frames transmitted from a given QKD endpoint 105 [act 920]. QKD endpoints 105 may transmit keys via frames as disclosed in co-pending application Ser. No. 10/271,103, entitled "Systems and Methods for Framing Quantum Cryptographic Links," and filed on Oct. 15, 2002, the disclosure of which is incorporated by reference herein in its entirety. NMT 125 may send a message to selected QKD endpoints 105 to set the number of bits in transmitted frames.

NMT 125 may assign network addresses for given QKD endpoints 105 [act 925]. Such network addresses may include, for example, Internet Protocol (IP) addresses. NMT may send a message to selected QKD endpoints 105 to assign the network addresses. NMT 125 may further configure which security associations (SAs) should use quantum cryptography [act 930]. The SAs may include a one-way relationship between a sending QKD endpoint 105 and a receiving QKD endpoint 105 that affords security services to the traffic carried on it. SAs are used in conventional network security protocols, such as, for example, Internet Protocol Security (IPsec). NMT 125 may configure the SAs by sending a message to the appropriate QKD endpoints 105. NMT 125 may further configure how many QKD secret bits should be mixed into a given IKE key used in key exchange [act 935]. NMT 125 may send a message to selected QKD endpoints 105 to configure the number of QKD secret bits mixed into an IKE key. NMT 125 may additionally configure how often IKE re-keying should be performed [act 940]. NMT 125 may send a message to appropriate QKD endpoints 105 to configure the IKE re-keying interval.

Acts 905-940, as described above, may be performed sequentially or in parallel.

Exemplary QKD Endpoint Event Notification Process

Figure 10:
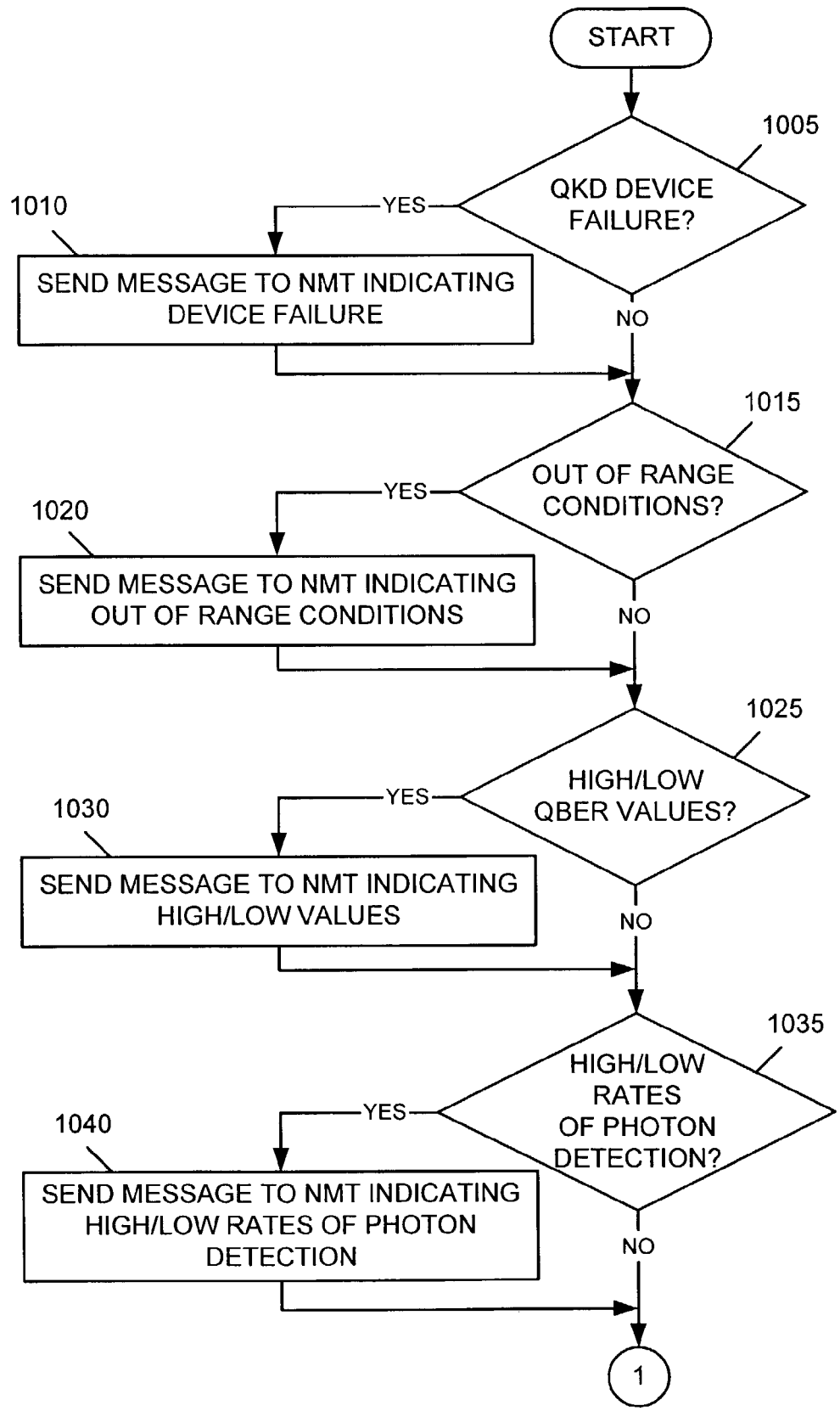
FIGS. 10-11 are flow charts that illustrate an exemplary process for notifying a network management terminal of unplanned events occurring at QKD endpoints consistent with the present invention.
Figure 11:
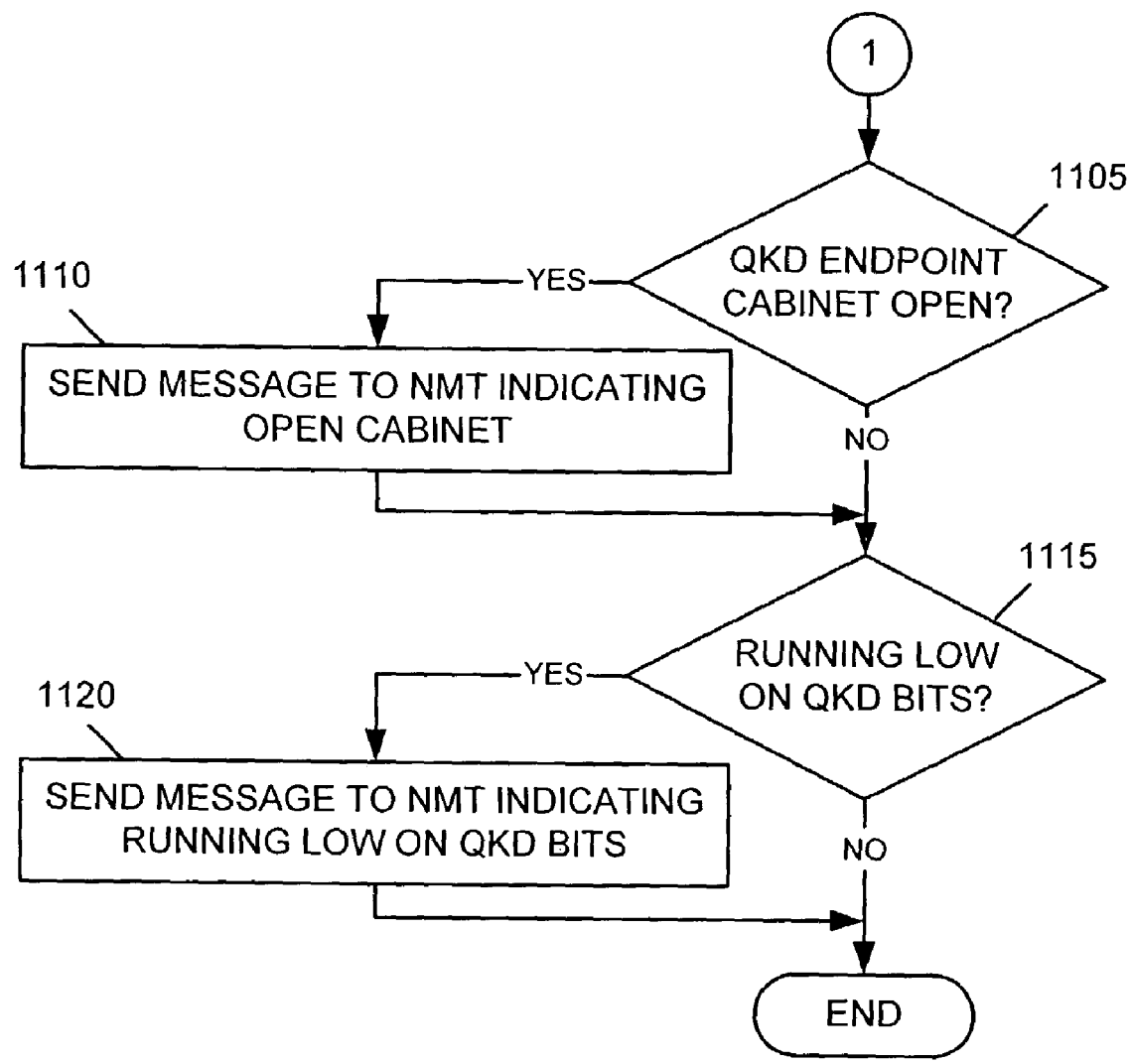

FIGS. 10-11 are flowcharts that illustrate an exemplary process, consistent with the present invention, for notifying an NMT 125 of unplanned events that occur at a QKD endpoint 105. As one skilled in the art will appreciate, the method exemplified by FIGS. 10-11 can be implemented as a sequence of instructions and stored in a memory 510 of each QKD endpoint 105 of network 100 for execution by a respective processing unit 505.

The exemplary process may begin with a determination of whether there has been a QKD device failure [act 1005]. Such a QKD device may include a component or device of QKD endpoint 105, such as, for example, lasers or detectors. If there has been a QKD device failure, QKD endpoint 105 may send a message to NMT 125 identifying the device failure [act 1010]. QKD endpoint 105 may further determine whether any out of range conditions have occurred [act 1015]. The out of range conditions may include any significant deviations from normal operating parameters of QKD-endpoint 105. Such out of range conditions may include, for example, abnormal temperatures or power failures associated with devices of QKD endpoint 105. If any out of range conditions have occurred, QKD endpoint 105 may send a message to NMT 125 indicating each of the out of range conditions [act 1020]. QKD endpoint 105 may also determine the occurrence of high or low quantum bit error rate (QBER) values [act 1025]. QKD endpoint 105 may maintain thresholds beyond which high or low QBER values are indicated. If high or low QBER values exist, QKD endpoint 105 may send a message to NMT 125 indicating each of the high/low QBER values [act 1030].

QKD endpoint 105 may determine whether any high or low rates of photon detection have occurred [act 1035]. QKD endpoint 105 may maintain photon detection rate thresholds beyond which high or low rates are indicated. If high or low photon detection rates have occurred, QKD endpoint 105 may send a message to NMT 125 indicating occurrences of the high or low rates of photon detection [act 1040]. QKD endpoint 105 may further determine whether the physical cabinet housing QKD endpoint 105 is open [act 1105]. If so, QKD endpoint 105 may send a message to NMT 125 indicating the open cabinet [act 1110]. QKD endpoint 105 may also determine whether QKD bits are running low [act 1115]. QKD endpoint 105 may maintain a lower QKD bit threshold beyond which a low number of QKD bits are indicated. If the QKD bits are running low, QKD endpoint 105 may send a message to NMT 125 indicating the low number of QKD bits [act 1120].

The messages described in acts 1010-1120 above may be batched together in a single message or in several messages to reduce the message traffic between QKD endpoint 105 and NMT 125.

Exemplary QKD Endpoint Monitoring Process

Figure 12:
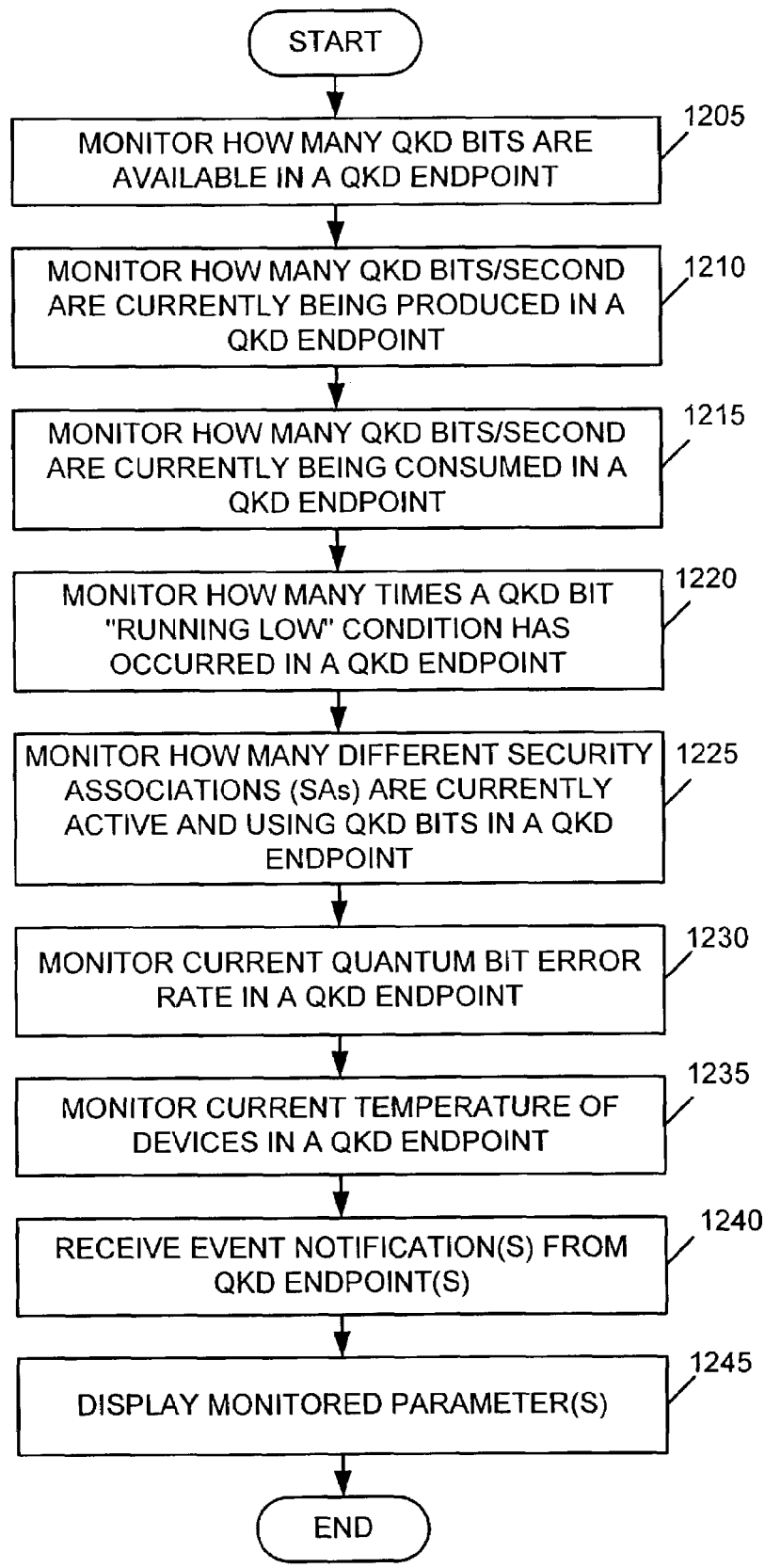
FIG. 12 is a flow chart that illustrates an exemplary process for monitoring QKD endpoints from a network management terminal consistent with the present invention.

FIG. 12 is a flowchart that illustrates an exemplary process, consistent with the present invention, for monitoring parameters, from a NMT 125, associated with QKD being implemented at QKD endpoints 105 of network 100. As one skilled in the art will appreciate, the method exemplified by FIG. 12 can be implemented as a sequence of instructions and stored in memory 310 of NMT 125 for execution by processing unit 305. "Monitoring" as described with respect to acts 1205-1245 below may involve one or more messages sent from NMT 125 to QKD endpoints 105 of network 100 requesting the monitored parameters. Each QKD endpoint 105 may reply to a received message with a message sent to NMT 125 that includes the monitored parameters. "Monitoring" as described with respect to acts 1205-1245 below may additionally include a periodic message (or messages) sent from each QKD endpoint 105 of network 100 that includes data regarding selected parameters monitored by NMT 125.

The exemplary process may begin with NMT 125 monitoring how many QKD bits are available in a given QKD endpoint 105 [act 1205]. NMT 125 may further monitor how many QKD bits per second are currently being produced in a given QKD endpoint 105 [act 1210]. NMT 125 may also monitor how many QKD bits per second are currently being consumed in a given QKD endpoint 105 [act 1215]. NMT 125 may monitor how many times a QKD bit "running low" condition has occurred in a given QKD endpoint 105 [act 1220]. A counter may be periodically reset and the number of times a QKD bit "running low" condition occurs may be counted before the next counter reset.

NMT 125 may monitor how many different SAs are currently active and using QKD bits in a given QKD endpoint 105 [act 1225]. NMT 125 may also monitor a current QBER in a given QKD endpoint 105 [act 1230]. NMT 125 may additionally monitor current temperatures of devices in a given QKD endpoint 105 [act 1235]. NMT 125 may further receive one or more unplanned event notifications from QKD endpoints 105 [1240]. The unplanned event notifications may result from the exemplary process described above with respect to FIGS. 10-11. NMT 125 may display monitored parameters via output device 320 [act 1245].

Figure 13:
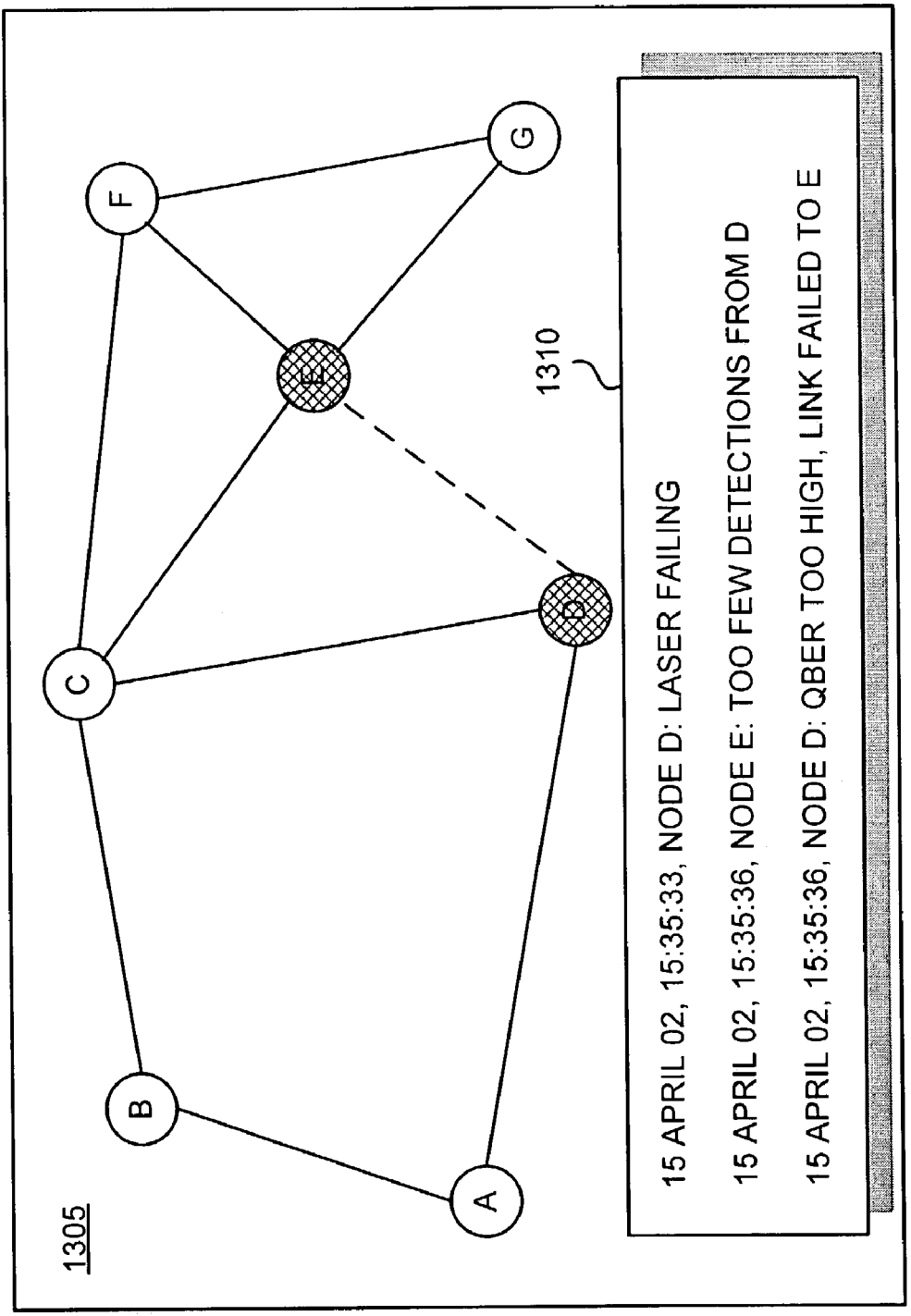
FIG. 13 illustrates an exemplary graphic interface associated with a network management terminal consistent with the present invention.

FIG. 13 illustrates an exemplary graphical interface 1305 of output device 320 on which a network map and the various parameters monitored in acts 1205-1240 above may be displayed. Graphic interface 1305 may also include a window 1310 that displays monitored parameters textually. As shown in FIG. 13, window 1310 may display textual data indicating the times at which various monitored events, associated with nodes (e.g., QKD endpoints 105 or QKD switches 205) of network 100, have occurred. The network map displayed in graphic interface 1305 may include icons representing the various nodes of network 100 that may turn different colors upon the occurrence of certain events. For example, the icons may turn red when errors or alerts occur. Output device 320 may additionally output audible sounds, such as beeps or alarms, upon the occurrence of unusual or significant events. In addition to displaying monitored parameters, NMT 125 may share the monitored parameter data with other computer systems via data files stored on disk, or via network protocols such as CORBA.

Exemplary QKD Endpoint/Switch Control Process

Figure 14:
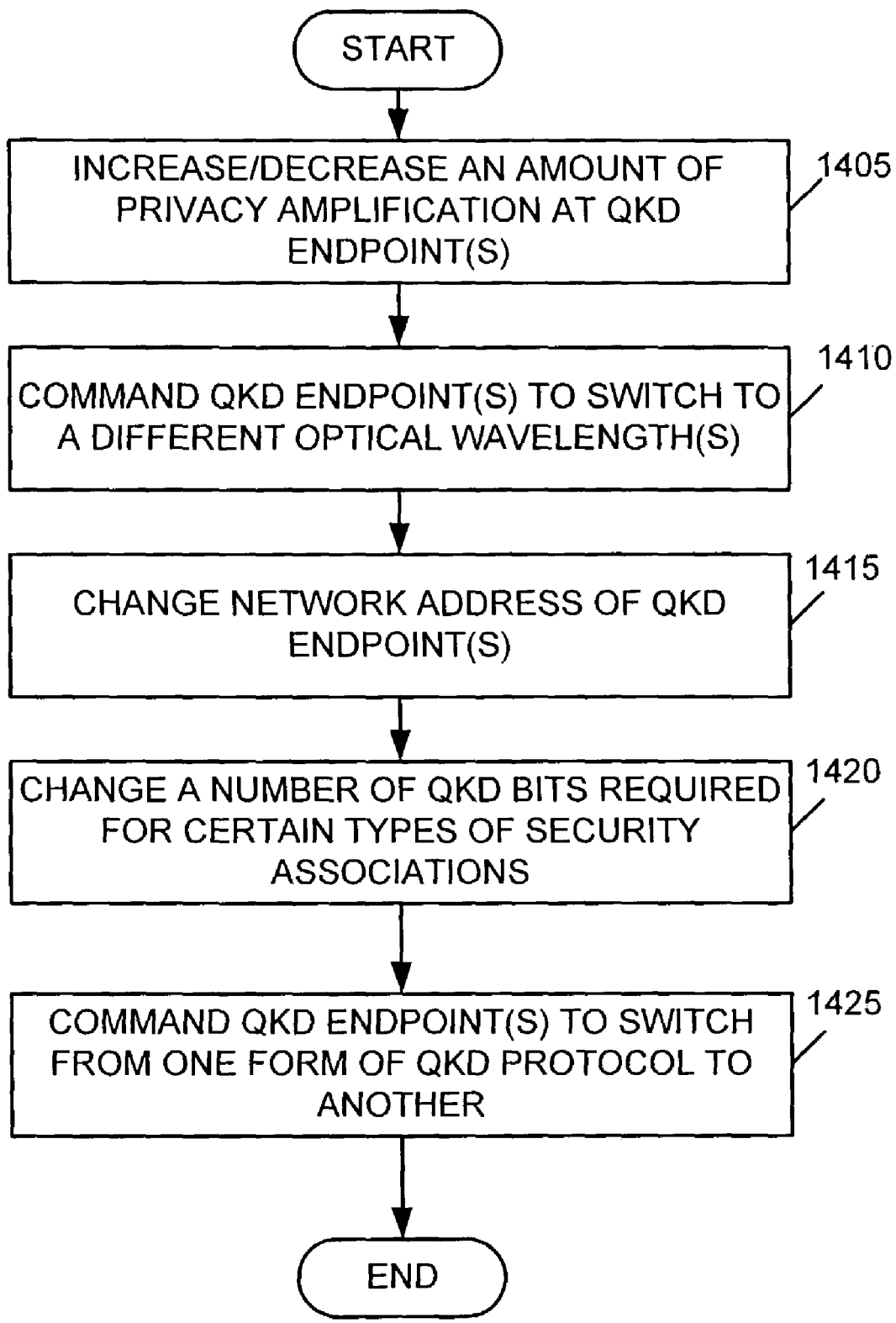
FIG. 14 is a flow chart that illustrates an exemplary QKD endpoint control process consistent with the present invention.

FIG. 14 is a flowchart that illustrates an exemplary process, consistent with the present invention, for NMT 125 control of QKD endpoints 105 and or QKD switches 205 of network 100. As one skilled in the art will appreciate, the method exemplified by FIG. 14 can be implemented as a sequence of instructions and stored in memory 310 of NMT 125 for execution by processing unit 305.

The exemplary process may begin with NMT 125 increasing and/or decreasing an amount of privacy amplification applied at one or more QKD endpoints 105 of network 100 [act 1405]. NMT 125 may send a message to selected QKD endpoints 105 commanding them to increase or decrease the amount of privacy amplification applied to the QKD process. For example, parameters of a hash function $f$ used for privacy amplification may be varied to increase/decrease the number of resulting key K symbols. NMT 125 may further command one or more QKD endpoints 105 to switch to different optical wavelengths [act 1410]. Each QKD endpoint 105 may support multiple wavelengths and NMT 125 may command selected QKD endpoints 105 to switch to a different wavelength of respective supported wavelengths. NMT 125 may change network addresses associated with one or more QKD endpoints 105 of network 100 [act 1415]. NMT 125 may send a message to appropriate QKD endpoints 105 notifying them of a change in their assigned network addresses, such as, for example, a change in their assigned IP addresses. NMT 125 may change a number of QKD bits required for certain types of SAs [act 1420]. NMT 125 may also command one or more QKD endpoints 105 of network 100 to switch from one form of QKD protocol to another [act 1425]. For example, NMT 125 may command one or more QKD endpoints 105 to switch from BB84 protocol to B92 protocol, or vice versa.

CONCLUSION

Systems and methods consistent with the present invention, therefore, provide mechanisms for configuring, monitoring and actively managing nodes and links of a quantum cryptographic network. A network management terminal may be interconnected with the nodes of a quantum cryptographic network for configuring and managing operational parameters associated with the nodes and links of the network. The network management terminals may, thus, assist in managing the nodes and links of the quantum cryptographic network to ensure maintenance of the desired "any to any" connectivity.

The foregoing description of embodiments of the present invention provides illustration and description, but is not intended to be exhaustive or to limit the invention to the precise form disclosed. Modifications and variations are possible in light of the above teachings or may be acquired from practice of the invention. While a series of acts have been described in FIGS. 9-12 and 14, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method of displaying quantum cryptographic parameters associated with a plurality of nodes in a quantum cryptographic network, comprising:

monitoring quantum cryptographic parameters associated with the plurality of nodes, wherein the quantum cryptographic parameters comprise at least one of a number of quantum cryptographic bits produced at each of the plurality of nodes using quantum cryptographic techniques; a number of quantum cryptographic bits, produced using quantum cryptographic techniques, consumed in each of the plurality of nodes; a number of different security associations (SAs) active, and using quantum cryptographic bits produced using quantum cryptographic techniques, in each of the plurality of nodes; or a quantum bit error rate (QBER), determined using quantum cryptographic techniques, associated with each of the plurality of nodes; and displaying the monitored quantum cryptographic parameters in at least one of textual and graphical form at a remote location.

2. The method of claim 1, further comprising:

managing the plurality of nodes of the quantum cryptographic network based on the monitored parameters.

3. A computer-readable medium containing instructions for controlling at least one processor to perform a method for displaying quantum cryptographic parameters associated with a plurality of nodes in a quantum cryptographic network, the method comprising:

receiving quantum cryptographic parameters associated with the plurality of nodes, wherein the quantum cryptographic parameters comprise at least one of a number of quantum cryptographic bits produced at each of the plurality of nodes using quantum cryptographic techniques; a number of quantum cryptographic bits, produced using quantum cryptographic techniques, consumed in each of the plurality of nodes; a number of different security associations (SAs) active, and using quantum cryptographic bits produced using quantum cryptographic techniques, in each of the plurality of nodes; or a quantum bit error rate (QBER) determined using quantum cryptographic techniques, associated with each of the plurality of nodes; and displaying the received quantum cryptographic parameters in at least one of textual and graphical form.

4. A quantum cryptographic network management device, comprising:

a memory configured to store instructions; and a processor configured to execute the instructions in the memory to:

receive quantum cryptographic parameters associated with a plurality of nodes of a quantum cryptographic network, wherein the quantum cryptographic parameters comprise at least one of a number of quantum cryptographic bits produced at each of the plurality of nodes using quantum cryptographic techniques; a number of quantum cryptographic bits, produced using quantum cryptographic techniques, consumed in each of the plurality of nodes; a number of different security associations (SAs) active, and using quantum cryptographic bits produced using quantum cryptographic techniques, in each of the plurality of nodes; or a quantum bit error rate (QBER), determined using quantum cryptographic techniques, associated with each of the plurality of nodes, and cause the received quantum cryptographic parameters to be displayed in one or more of a textual form and a graphical form.

* * * * *